United States Patent [19]
Cronley

[11] Patent Number: 5,788,289
[45] Date of Patent: Aug. 4, 1998

[54] ONE-PIECE COUPLER FOR CONNECTING HOSES

[76] Inventor: Gerald Cronley, 3637 Lake Lynn Dr., Gretna, La. 70056

[21] Appl. No.: 525,200

[22] Filed: Sep. 8, 1995

Related U.S. Application Data

[63] Continuation-in-part of Ser. No. 323,489, Oct. 14, 1994, Pat. No. 5,503,437.

[51] Int. Cl.$^6$ ........................... F16L 17/00
[52] U.S. Cl. ............... 285/102; 285/322; 137/533.17
[58] Field of Search ........................ 285/100, 101, 285/102, 322, 323, 375; 137/218, 533.17, 543.19

[56] References Cited

U.S. PATENT DOCUMENTS

| | | | |
|---|---|---|---|
| 1,297,719 | 3/1919 | Myers | 285/322 X |
| 1,315,784 | 9/1919 | Levitt | 285/322 X |
| 1,927,582 | 9/1933 | Denk | 137/218 X |
| 1,966,278 | 7/1934 | Barks et al. | 285/102 |
| 2,098,514 | 11/1937 | Nord | 285/102 |
| 2,327,714 | 8/1943 | Iftiger, Sr. | 285/35 |
| 2,383,692 | 8/1945 | Smith | 285/322 |
| 2,388,179 | 10/1945 | Prowd | 285/35 |
| 3,394,950 | 7/1968 | Jensen | 285/35 |
| 4,660,803 | 4/1987 | Johnston | 137/533.17 |
| 4,856,823 | 8/1989 | Heren | 137/533.17 X |
| 5,112,087 | 5/1992 | Haruki | 285/101 |
| 5,118,140 | 6/1992 | Racine et al. | 285/102 |
| 5,150,924 | 9/1992 | Yokomatsu et al. | 285/101 |
| 5,209,528 | 5/1993 | Weh et al. | 285/375 X |
| 5,217,039 | 6/1993 | Hoeptner, III | 137/218 |

FOREIGN PATENT DOCUMENTS

| | | | |
|---|---|---|---|
| 968388 | 5/1975 | Canada | 285/322 |
| 1210637 | 2/1966 | Germany | 285/322 |
| 789 | of 0000 | United Kingdom | 285/393 |
| 1241867 | 7/1971 | United Kingdom | 285/322 |

*Primary Examiner*—Dave W. Arola
*Attorney, Agent, or Firm*—Milton S. Gerstein

[57] ABSTRACT

A hose-coupler made up of a just one component having a main housing section with a female end and a male end. The second female end of the coupler is formed with interior threads, for receiving therein a portion of the male end of the second hose. The main housing section has a compressible portion adjacent to the first male end thereof all the way to the end of the female end. In order to compress the clamping jaws, there is provided a slidable outer housing. The male end is sealed in the female end of the coupler by a biased piston-member that forces a sealing washer against the male end by means of the pressurized fluid volume in the interior of the coupler. Two embodiments are disclosed: A first one that allows the coupler to be disconnected from the male end of a hose only after the water pressure has been turned off; and a second embodiment that allows the coupler to be disconnected from the male end of a hose also while the water pressure is still present. In the second embodiment, a check valve prevents the back-flow of back-pressurized fluid through the coupler after the coupler has been disconnected from a male end of a component.

10 Claims, 5 Drawing Sheets

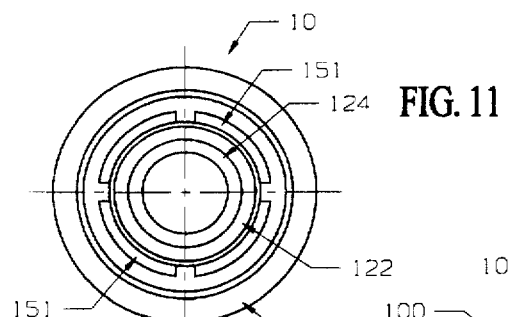
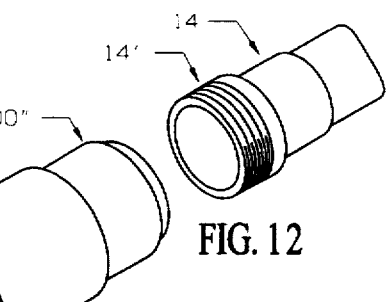
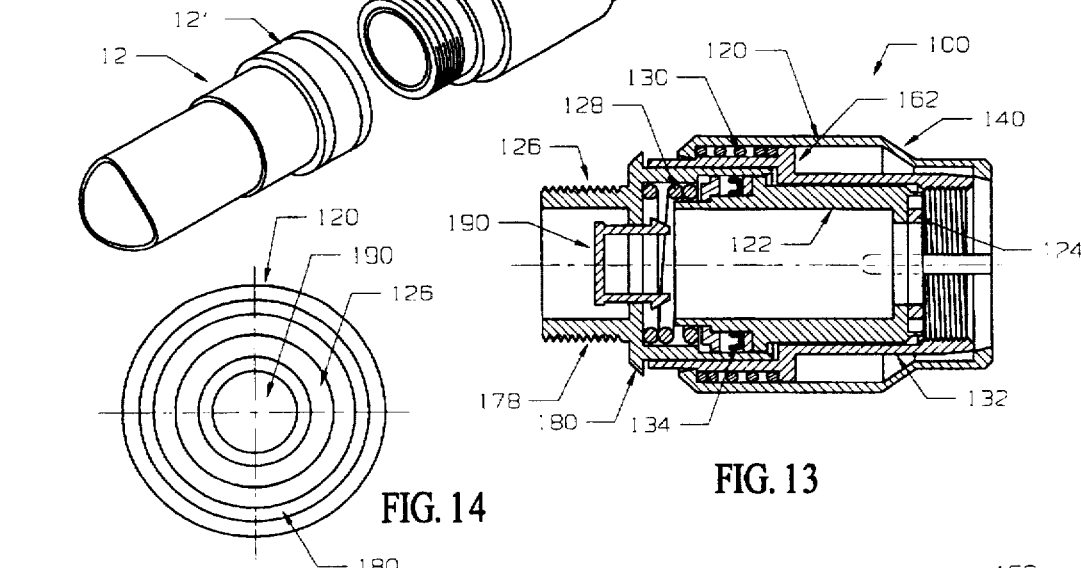
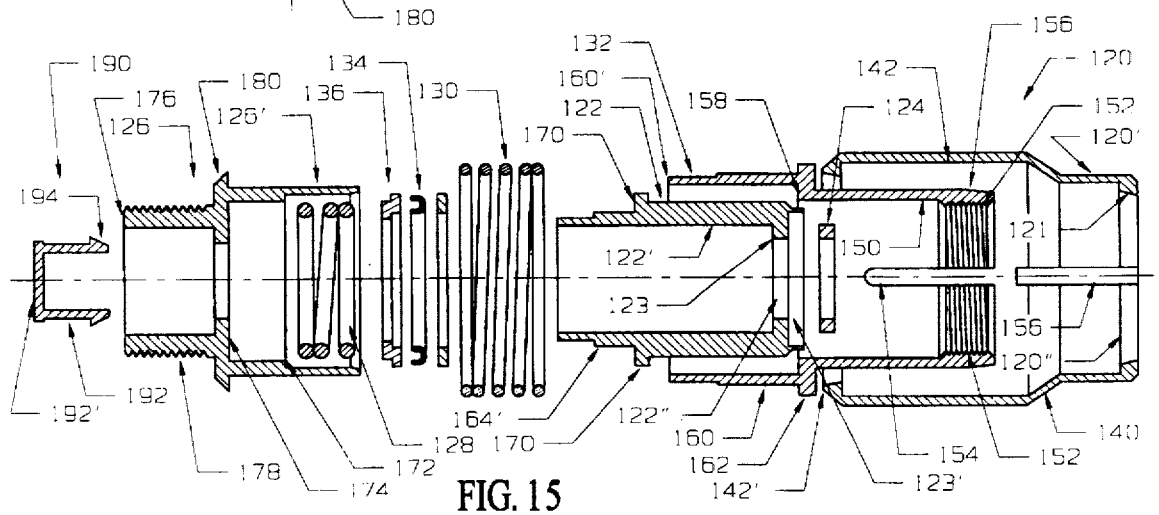

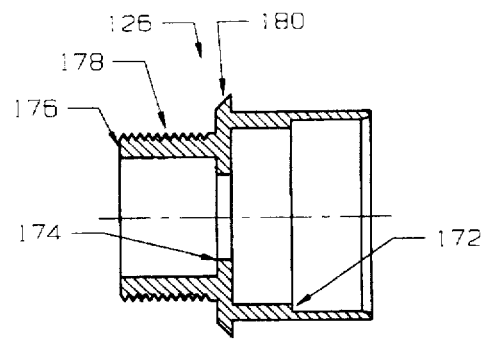
FIG. 16
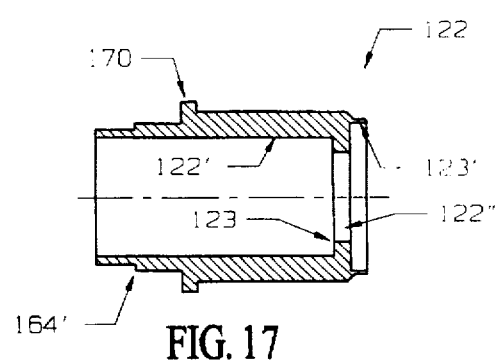
FIG. 17
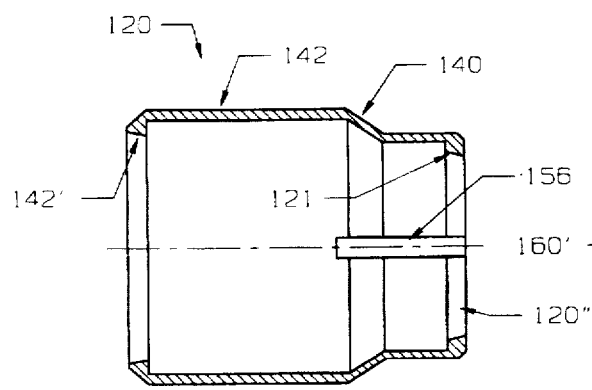
FIG. 18
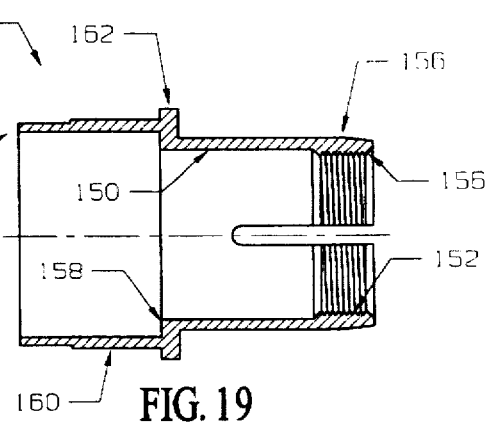
FIG. 19
FIG. 20
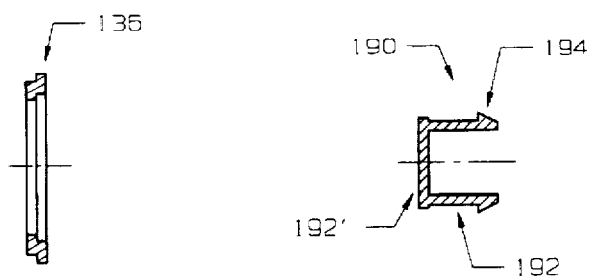
FIG. 21
FIG. 22
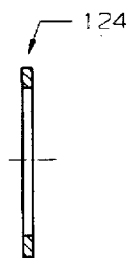

ONE-PIECE COUPLER FOR CONNECTING HOSES

CROSS-REFERENCE TO RELATED APPLICATION

The present application is a continuation-in-part of Applicant's application Ser. No. 08/323,489, filed on Oct. 14, 1994, now U.S. Pat No. 5,503,437.

BACKGROUND OF THE INVENTION

The present invention is directed to a coupler for connecting the ends of two hoses together. There are presently hose-connectors for connecting the ends of hoses, which prior-art hose-connectors are made up of two, interconnecting components. Each component, or part, has a male end and a female end. The male end of the first component is connectable to the female end of one hose, while the female end of the other component is connectable to the male end of another hose. The female end of the first component and the male end of the second component are, then, telescopingly mounted together to complete the coupling of the ends of the hoses. The first component of the coupler is provided with interior roller bearings at the female end thereof, for releasably gripping an annular groove formed in the male end of the second component, whereby the two components of this prior-art coupler are interconnected. To de-couple the two components, there is provided a retractable outer sleeve that slides over the female end of the first component. In its fully retracted position, which is achieved by overcoming a biassing force that normally pushes the sleeve into its locking position, the sleeve allows the roller bearings to be pushed into the interior of the housing of the first component, whereby the male end of the second may then be pulled out, in order to decouple the two hoses. When the sleeve in its unretracted position, it prevents the roller bearings from entering into the housing of the first component, whereby the rollers bearings are prevented from escaping out of the annular groove formed in the male end of the second component, thus firmly locking the two component together for coupling the two hoses together.

While the prior-art coupler is effective, it suffers from a number of disadvantages. The prior-art coupler requires two separate parts or components, as above-described: One component fitting over the female end of the first hose, and a second component fitting in the male end of the second hose. Thus, not only is the cost for making such a coupler considerable, owing to the plurality of parts, but, moreover, if one of the two components of the coupler is lost, then the two hoses may not be coupled together until a replacement-component is purchased. It is not uncommon for a retailer to sell only the complete, two-component coupler, but not each individual component separately. Thus, it is not uncommon that, if one component is lost, the user must purchase an entirely new coupler of two components, since replacement component-parts are not, typically, readily available. This, again, adds considerable cost to the user.

SUMMARY OF THE INVENTION

It is, therefore, the primary objective of the present invention to provide a coupler for hoses which is made of only one component part, and not two, and which, thus saves considerably on the cost of manufacture and the cost to the consumer.

It is another objective of the present invention to provide a coupler for hoses which is considerably easier to use than the prior-art, two-piece coupler.

Toward these and other ends, the hose-coupler of the invention is made up of a just one component having a main housing section with a female end and a male end. One male end of the coupler is received in the female end of a first hose, and the other female end of the coupler receives a male end of a second hose to be fluidly coupled to the first hose. The first male end of the coupler is provided, in a conventional manner, with exterior threads that mate with the interior threads of the female end of the first hose. The second female end of the coupler is formed with interior threads, for receiving therein a portion of the male end of the second hose. In order to compress the clamping jaws, in order to lock the male end of the second hose in the female end of the coupler, there is provided a piston slidable within an outer housing, which piston and housing are forced in opposite directions by means of the water pressure therein. The clamping jaws and the threaded end of the outer housing have cooperating camming surfaces. As the outer housing is forced away from the piston, the cooperating camming surfaces are engaged, contracting, or compressing, the clamping jaws to clampingly engage against the threads of a male end of a hose, tube or another coupler positioned in the female end of the coupler. Since the water pressure itself in the coupler causes the jaws to be contracted or compressed via the outer housing, the coupler of the invention cannot be uncoupled from the male end of the hose to which it has been connected at its female end, until the water pressure is relieved, such as by shutting of the flow-valve controlling the flow of the water to the hoses or tubes to which the coupler of the invention is connected. Since this coupler cannot be removed unless the water pressure is released, this coupler has especial use with a sprinkler, hand-nozzle, and water hook-ups of recreational vehicles, as well as in any environment where it is beneficial that the coupler not be disconnected as long as the water pressure is present.

In the second embodiment of the invention, the coupler may be disconnected even while under pressurization. In this embodiment, the outer housing is free to slide relative to the other component-parts of the coupler, and is spring-biassed to cause the threaded clamping jaws into locking engagement with the male end of a hose to be coupled to a female end of another hose. By sliding the outer housing against the bias of the spring, the jaws are allowed to expand in order to insert the male end of the hose. After insertion of the male end of the hose, the outer housing is allowed to return by means of the biasing force of the spring, whereupon interior camming surfaces cam against cooperating camming surfaces of the jaws, to thereby contract or compress the jaws in a collet-like manner, to lockingly engage with the male end of the hose. In this embodiment, there is also provided a check-valve that prevents the back-flow of water through the coupler after the coupler has been disconnected from the male end of the hose.

BRIEF DESCRIPTION OF THE DRAWING

The invention will be more readily understood with reference to the accompanying drawing, wherein:

FIG. 11 is a first end view of a second embodiment of the hose coupler of invention, from its female end;

FIG. 12 is an isometric view of the second embodiment of the hose coupler of the invention;

FIG. 13 is a longitudinal cross-section view showing the sections of the second embodiment of the invention assembled;

FIG. 14 is a second end view of the second embodiment, from the male end;

FIG. 15 is a longitudinal cross-sectional assembly view of the hose coupler of the invention;

FIG. 16 is a plan view of the male-end sleeve of the coupler of the second embodiment;

FIG. 17 is a plan view of the piston-member of the coupler of the second embodiment;

FIG. 18 is a plan view of the outer sleeve or housing of the coupler of the second embodiment;

FIG. 19 is a plan view of the jaw-element, or split collet, of the coupler of the second embodiment;

FIG. 20 is a plan view of the offset washer of the coupler of the second embodiment;

FIG. 21 is a plan view of the check valve of the coupler of the second embodiment; and FIG. 22 is a plan view of the flat washer of the coupler of the second embodiment.

DETAILED DESCRIPTION OF THE INVENTION

Figure 1:
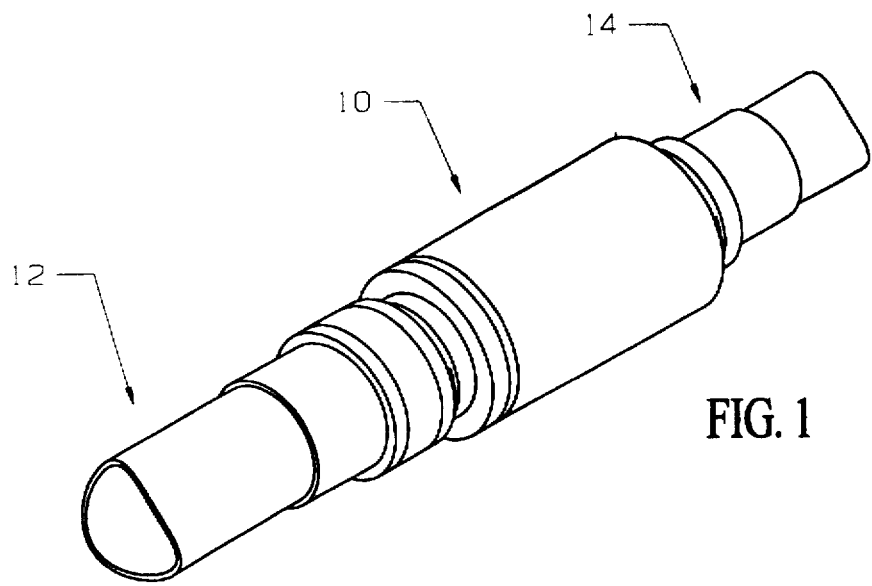
FIG. 1 is an isometric view of a first embodiment of the hose coupler of the invention shown connected between the ends of two hoses.
Figure 2:
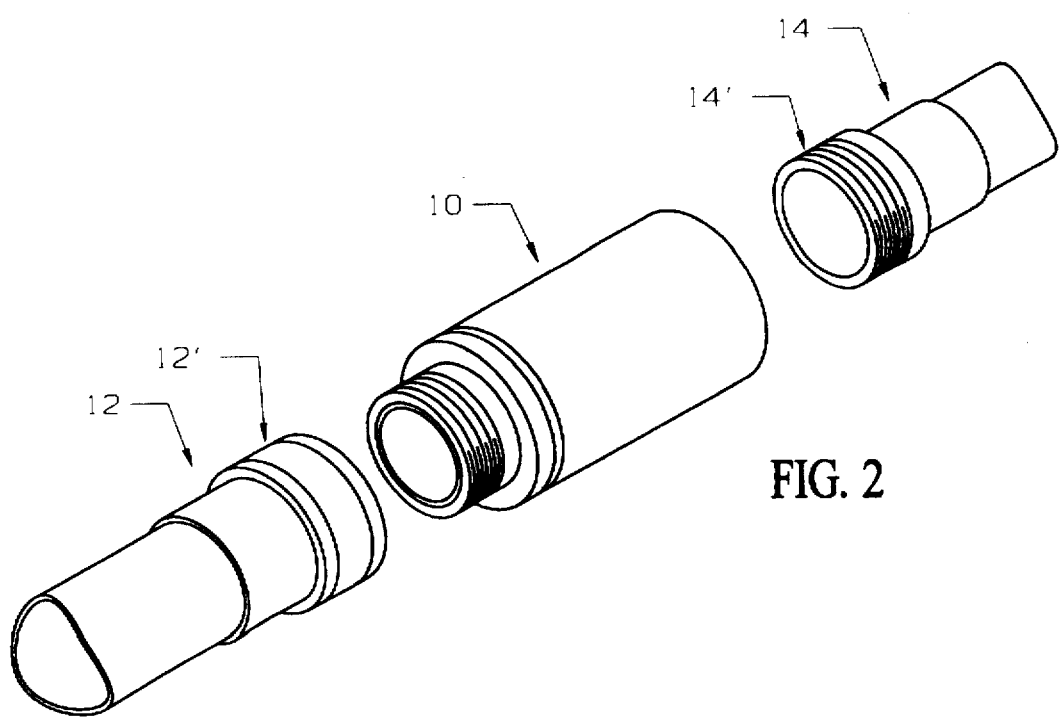
FIG. 2 is an isometric view of the hose coupler of the invention showing how the ends of two hoses are coupled together thereby.

Referring now to the drawings in greater detail, where like reference numerals indicate like parts, the first embodiment of the hose coupler of the invention is indicated generally by reference numeral 10 in FIGS. 1–10. The coupler 10 is a one-piece component, unlike the prior-art hose couplers that are two-piece couplers. The coupler 10 interconnects a female end 12' of a first hose 12 to a male end of 14' of a second hose 14. The coupler, therefore, has a male end 10' having exterior threads for being mounted within the female end 12' of the first hose. The coupler 10 also has a second female end 10" that telescopingly receives therein the male end 14' of the second hose 14. The female connecting end 10" of the coupler 10 is provided with interior threads for engagement with the exterior threads of the threaded male end 14' of the second hose 14. However, it is not practical, nor in most circumstances possible, to allow for the threaded male end 14' of the second hose to be rotated into the threaded female connecting end 10" of the coupler, since, when the other end of the hose is coupled to a water source or to another hose, such rotation will cause the hose or tubing 14 to twist, which would result in the twisting of the hose 14 itself, thus impeding the flow of water therethrough. In most cases, however, it is not possible to rotate the male end the requisite number of turns to achieve a watertight, sealing connection with the female end, whether the other, female end of the hose is, or is not, connected to another male connection. Therefore, in accordance with the present invention, the connecting female end 10" of the coupler 10 is made as an expandable mandrel or arbor, which is forced or compressed against the threads of the male end 14' inserted therein by means described hereinbelow.

Referring to FIGS. 3–10, the single-component hose coupler 10 is made up of six, separate, interconnected parts: A main outer housing 20, an interior, gasket-mounting piston sleeve 22, a gasket or washer proper 24, a threaded male-end sleeve 26, a compression-spring 28, and female end, threaded clamping jaw-element, or split collet, 30.

Figure 3:
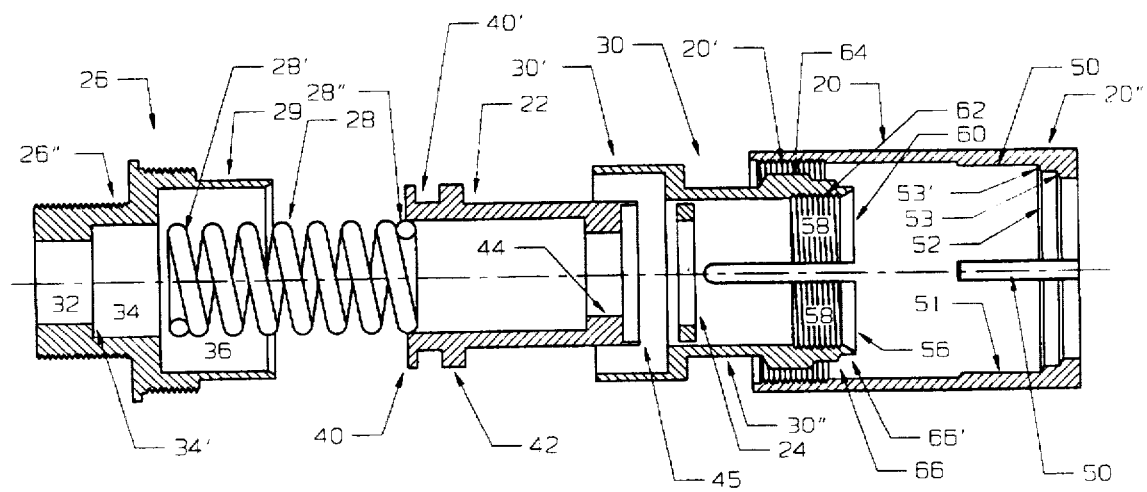
FIG. 3 is a longitudinal cross-sectional assembly view of the hose coupler of the invention.

The main housing 20 (FIGS. 3, 4 and 8) has a first end that is an interiorly-threaded first end 20' that is threadingly connected to exterior threads 26' of the male-end sleeve 26. The male-end sleeve has a first, outwardly-projecting, exterior-threaded portion 26" which serves as the actual connection to the female end 12' of the hose or tube 12, shown in FIG. 2 and previously described. The male-end sleeve 26 is stepped, so that the portion containing the exterior threads 26' is of greater diameter than the portion 26". The larger-diameter section in which is contained the exterior threads 26' has a longitudinal extension 29. The interior of the male-end sleeve defines three different, coaxially-arranged hollow volumes, increasing in order in diametric extent, as seen in FIG. 3. The first volume 32 allows the flow of water therethrough. The second volume 34 also allows the flow of water therethrough, and additionally forms an annular wall 34' against which first end 28' of the spring 28 abuts. The third and largest volume 36 also allows the flow of water therethrough, and additionally receives therein a portion of the sliding piston-member 22, as best seen in FIG. 4.

The sliding piston-member 22 (FIGS. 3, 4 and 10) is a cylindrically-shaped member having a first annular flange 40 at the very edge of the piston-member, at the end thereof positioned within the male-end sleeve 26, and a second annular flange 42 spaced from the first annular flange. The space or volume 40' between these two annular flanges 40, 42 also receives water therein by means of fluid communication with the three volumes 32, 34 and 36 of the male-end sleeve. Thus, the volume 40' is also pressurized as long as the hoses to which the coupler 10 is connected is also pressurized. The male-end-facing surface of the annular flange 42 supports and mounts a seal-ring 42' (FIG. 4); it is, therefore, preferable that the annular flange 42 is of greater thickness than the annular flange 40, in order to support and mount the seal-ring 42'. The sliding piston-member has at its other end, located adjacent the female end of the coupler, an interior, annular ring 44, which annular ring is spaced a slight distance from the very end 45 of the piston-member, so as to form a seat in which the washer or sealing ring 24 may be mounted. The surface of the interior annular ring 44 facing toward the male end of the coupler serves as an abutment stop for the second end 28" of the compression spring 28, whereby the compression spring is seated within the interior of the piston-member 22, with one end 28' against the annular wall 34' of the male-end sleeve, and the other end 28" against the annular ring 44. Thus, the spring 28 forces the piston-member 22 to the right in FIG. 3, that is toward the female end, so that the washer is pushed against and sealingly compressed by the contacting end-surface of the mating male end 14' of the hose 14.

The outer main housing 20 (FIGS. 3, 4 and 8) has, in addition to the previously described interior threads 20', a female-end mounting end-section 20". This end-section 20" is provided with four, equiangularly-spaced apart, elongated interior ribs 50, spaced 90 degrees apart. These ribs are used for guiding the clamping jaw-element 30 in the interior of the housing 20 during assembly, and in order to prevent rotation of the clamping jaw-element within the housing. The end-section 20" is also provided with an interior, annular, stepped, camming surface portion 52 which, as described hereinbelow, serves to compress or contract the clamping jaw-element's segregated jaws into threaded engagement with the threads of the male end 14' of the hose 14 being coupled to the hose 12. The stepped, annular camming surface portion 52 consists of two sloping camming surfaces 53, 53', each having a slope of approximately 30 degrees with respect to the vertical.

Figure 4:
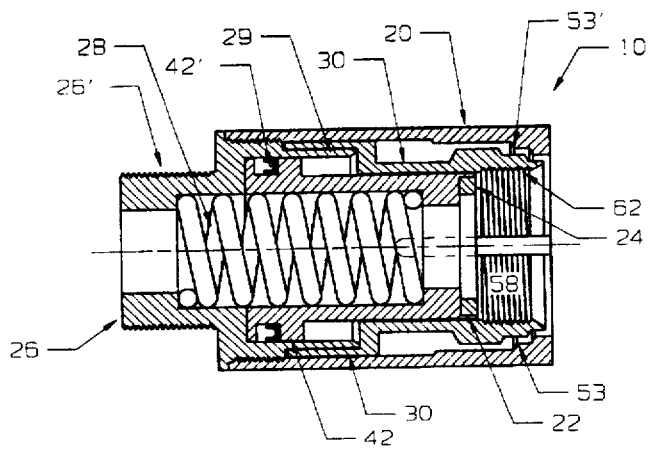
FIG. 4 is a longitudinal cross-section view the sections of the hose coupler of the invention assembled.
Figure 5:
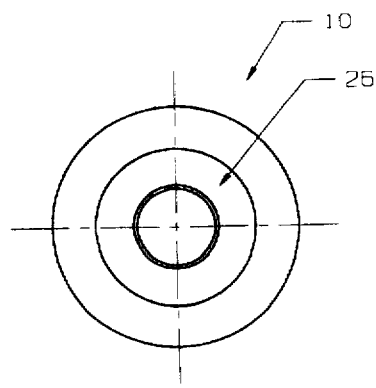
FIG. 5 is a first end view of the coupler of FIG. 1, from its male end.
Figure 6:
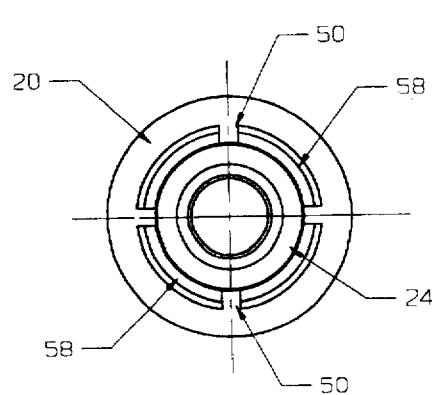
FIG. 6 is a second end view of the coupler of FIG. 1, from its female end.
Figure 7:
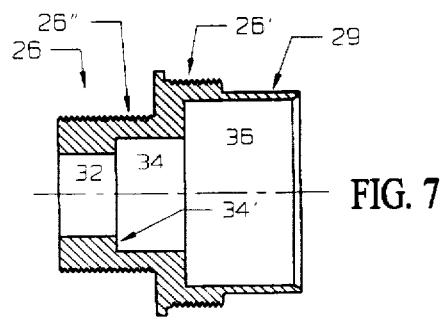
FIG. 7 is a plan view of the male end sleeve of the coupler of FIG. 1.
Figure 8:
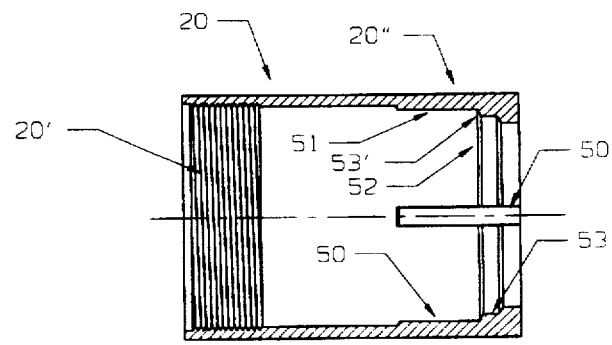
FIG. 8 is a plan view of the outer housing of the coupler of FIG. 1.
Figure 9:
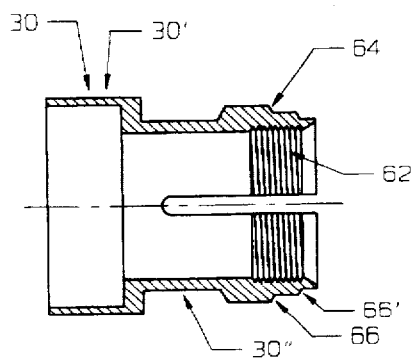
FIG. 9 is a plan view of the jaw-element of the coupler of FIG. 1.
Figure 10:
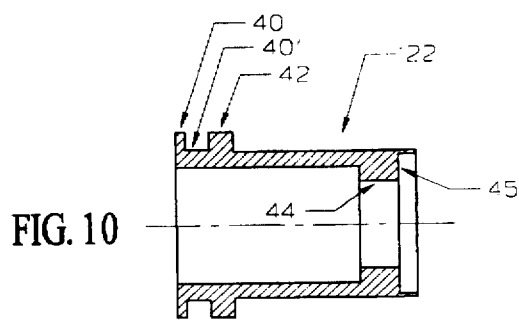
FIG. 10 is a plan view of the piston-member of the coupler of FIG. 1.

The clamping jaw-element 30 (FIGS. 3, 4, 6 and 9) includes a first tubular end 30' that has an opening greater than that of the longitudinal extension 29 of the male-end sleeve 26, so that, when assembled, the end 30' fits snugly in the annular gap between the longitudinal extension 29 of the male-end sleeve and the interior surface of the outer housing 20, as seen in FIG. 4, with such arrangement allowing the male-end sleeve 26 and the housing 20 fixedly connected to the male-end sleeve to slide relative to the jaw-element 22. The jaw-element 22 also has a central, tubular portion 30" of narrower diameter, which terminates into jaws-section 56. The jaws-section 56 consists of four, separate jaws 58, separated by four linear slots 60, which each linear slot receiving therein a respective elongate rib 50 of the outer housing 20. Each jaw 58 is provided with interior threads 62 which mate with exterior threads of the male end 14' of the hose 14, when the jaws 58 are compressed or contracted. The outer arcuate surface of each jaw 58 is also provided with a camming surface-portion 64, which consists of two camming surface-steps 66, 66', each forming a 30-degree sloping surface with respect to the vertical. These sloping, stepped-surfaces cooperate with the sloping camming surfaces 53, 53' of the outer housing 20, whereby, when the outer housing is slid relative to the jaw-element, the camming surface 52 forces the jaws 58 inwardly, in order to cause the threads of the jaws to engage with the threads of the male end 12' of the hose 12.

In operation, when connecting a hose 12 to a hose 14, one first connects the female end 12' of the hose 12 to the male end of the coupler 10 by engaging the exterior threads 26' of the male-end sleeve 26. To connect the male end 14' of the hose 14 to the female end of the coupler 10, one must first make sure that no water pressure is present in the hoses 12 and 14. Then, the male end 14' is pushed inside the female end of the coupler 10, until it is pressed against the washer 24 located thereat by means of the spring-biased piston-member 22. The location of the washer 24 is such that it is spaced (preferably 7/16 in.) from the end of the female end of the coupler 10 a great enough distance such that, when the male end 14' is pushed into the female end of the coupler, some of the exterior threads of the male end 14' partially engage with the interior threads 62 of the jaw-element 30. This partial engagement between the jaws of the jaw-element and the threads of the male end 14' is sufficient to prevent movement of the jaw element 30 relative to the male end 14'. After this partial engagement between the male end 14' and the washer 22 and threads 62 of the jaws, the water is turned on, causing a build-up of water pressure. Water pressure causes the outer housing to move toward the left, when viewing FIG. 4, as it contacts against the annular wall surface 34', against which an end of the spring 28 abuts. Water pressure is also experienced by the piston-member within the annular volume 40', which pressurized volume prevents the piston-member 22 from moving to the left with the housing. Sine the annular surface areas of the washer 24 is less than the annular surface area of the annular flange 42, the force exerted by the water pressure in the volume 40' tending to push the piston-member to the right when viewing FIGS. 3 and 4 is greater than the force exerted by the water pressure on the washer 24, thus causing the piston-member 22 to move toward the right when viewing FIGS. 3 and 4. As the male-end sleeve 26 with connected outer housing 20 moves to the left, camming surfaces 53, 53' of the outer housing are wedged against the cooperating camming surfaces 66, 66' of the jaws 58, to thereby cause the interior threads 62 of the jaws to be forcefully compressed against the exterior threads of the male end 14' positioned in the female end of the coupler 10. At all times, at first the compression spring 28, and then the additional force of the forced rightward-movement of the piston-member 22 by the water pressure, the piston-member forces the sealing washer 24 against the male end 14' to provide a liquid-tight seal.

As long as the water pressure is extant, it is not possible to the disconnect the coupler 10 from the male end 14'. Thus, in order to disconnect, one must first shut off the source of water pressure. This feature of the coupler 10 is especially useful in systems where it is not desirable, or not safe, to disconnect component hoses, tubes, and the like, while the system is still pressurized. Moreover, the coupler 10 also has useful application for connecting a sprinkler, a hand-held nozzle to a hose or hose system, or for use with water hook-ups of a recreational vehicle, since the water pressure may be released by opening the hand-held nozzle, or, in the case of the sprinkler and water hook-up of a recreational vehicle, there is no water pressure associated with it after the water source has been turned off. It is, therefore, also possible to make a sprinkler, hand-held nozzle, or water hook-up of a recreational vehicle, and other water components, such that the coupler 10 is formed as an integral part of the component. In such a case, the male-end sleeve 26 would actually be part of the water component unit, so that the outer threads 26" would not be necessary. For example, in the case of hand-held nozzle, the male-end sleeve 26 would be the bottom part of the actual shaft of the handle of the nozzle.

It is also to be noted that while the preferred embodiment has been disclosed as coupling the ends of two hoses, it is within the scope and purview of the invention to couple any tubing where it is necessary to couple a female end of a first tube to a male end of a second tube. Thus, the invention may be used in a variety of disciplines and arts, and may be used in environments for transporting gases as well as liquids.

Referring now to FIGS. 11–22, the second embodiment 100 of the invention is shown. The coupler 100, unlike, the first embodiment 10, may be disconnected even while the full water pressure in the system, to which the coupler 100 has been connected, is present. The coupler 100 interconnects a female end 12' of a first hose 12 to a male end of 14' of a second hose 14. The coupler, therefore, has a male end 100' having exterior threads for being mounted within the female end 12' of the first hose. The coupler 100 also has a second female end 100" that telescopingly receives therein the male end 14' of the second hose 14. The female connecting end 100" of the coupler 100 is provided with interior threads for engagement with the exterior threads of the threaded male end 14' of the second hose 14. However, it is not practical, nor in most circumstances possible, to allow for the threaded male end 14' of the second hose to be rotated into the threaded female connecting end 100" of the coupler, since, when the other end of the hose is coupled to a water source or to another hose, such rotation will cause the hose or tubing 14 to twist, which would result in the twisting of the hose 14 itself, thus impeding the flow of water therethrough. In most cases, however, it is not possible to rotate the male end the requisite number of turns to achieve a water-tight, sealing connection with the female end, whether the other, female end of the hose is, or is not, connected to another male connection. Therefore, in accordance with the present invention, the connecting female end 100" of the coupler 100 is made as an expandable mandrel or arbor, which is forced or compressed against the threads of the male end 14' inserted therein by means described hereinbelow.

The single-component hose-coupler 100 is made up of nine separate, interconnected parts: A main outer housing 120, an interior, gasket-mounting piston sleeve member 122, a gasket or washer proper 124, a threaded male-end sleeve 126, a first compression-spring 128, a second compression spring 130, a female end, threaded clamping jaw-element, or split collet, 132, annular U-cup seal 134, and offset abutment washer 136.

The main housing 120 (FIGS. 13, 15 and 18) in this embodiment is not connected to the male-end sleeve 126. The main housing 120 has a first, narrower-diameter end-portion 120' at the female end of the coupler 100, which defines a first open end 120" that has an interior camming surface 121 that forces the clamping collet or jaw-member 132 closed. The female-end, narrower-diameter end-portion 120' also has a four elongated, interiorly-projecting ribs or guides 121' used for slidingly mounting the jaw-member, as hereinbelow described. The main housing 120 has an intermediate, frusto-conical section 140, that terminates in a larger-diameter main section 142. The main section 142 terminates in an interior-facing, annular rim 142', which also defines the second open end of the main housing 120. The annular rim 142' serves as one abutment stop for an end of the compression spring 130, as described hereinbelow.

The clamping jaw-member or split collet 132 (FIGS. 13, 15 and 19) includes a first, narrower-diameter, tubular end-portion 150 having interior threads 152 at the female-end-facing opening. Four linear slots 154 subdivide the end-portion 150 into four, separate arcuate clamping jaws 151 to form a split collet, which slots 154 receive and guide therein the elongated ribs 156 of the outer housing, in order to prevent relative rotation therebetween. The female-end-facing end of the end-portion 150 is provided with a cooperating camming surface 156 which cooperate with the camming surface 121 of main housing, whereby, when the housing 120 is moved leftwardly when viewing FIGS. 13 and 15, the cooperating camming surfaces contract the individual jaws for causing the threads 152 to lockingly engage with the threads 14' of the hose 14. The jaw-member 132 has an intermediate, stepped region 158, which terminates into a male-end-facing end portion 160 having a larger diameter the female-end-facing end-portion 150. Surrounding the male-end-facing end of the end-portion 160 is an annular flange 162, which annular flange 162 serves as another abutment stop for the compression spring 130, as clearly seen in FIG. 13.

The piston-member 122 (FIGS. 13, 15 and 17) is a cylindrically-shaped member having a female-end-facing end-portion 122' terminating in a constricted opening 122" by means of an annular wall 123, and further has an annular end-rim 123' in which is received the sealing washer 124, against which washer abuts the end of the male end 14' of the hose 14 being coupled. The piston-member 122 also has a male-end-facing end-portion 164, which end-portion 164 is stepped to define a step 164', against which is mounted the offset washer 136 (See FIG. 20), which offset washer defines an interior stepped portion similar to that of the step 164'. The offset washer 136 serves as one abutment stop for the other compression spring 128. The piston-member 122 also has an intermediate, exterior annular flange 170, against which is mounted the U-cup seal 134. The annular volume between the intermediate annular flange 170 and the mounted, offset washer 136 is water-pressurized when the pressure source is activated. Thus, just as in the coupler 10 of the first embodiment, the piston-member 122 is urged to the right when viewing FIGS. 13 and 15 when the coupler is pressurized, as explained above. As in the coupler 10 of the first embodiment, the compression spring 128 serves to initially bias the piston-member 122 to load the washer 124 against the male end 14', with subsequent force being applied by the pressurized movement of the piston-member after the coupler has been pressurized.

The male-end sleeve 126 has a first, tubular end-portion 126' which receives therein the portion of the piston-member starting from adjacent the intermediate annular flange 170 to the male-end-facing opening thereof, as clearly seen in FIG. 13. The interior of the end-portion 126' is also stepped and provided with an annular seat 172 against which may be seated the larger-diameter portion of the offset washer 136. The tubular end-portion 126' is circumferentially-surrounded by, and coaxial with, the male-end-facing end portion 160 of the jaw-member 132. The male-end sleeve 126 has an intermediate section defining an interior annular wall 174 against which abuts another end of the compression spring 128, with the annular wall 174 defining a circular through-opening 174'. The male-end sleeve terminates in a narrower-diameter end-portion 176 with exterior threads 178 for mating with the female end 12' of the hose 12. Surrounding the intermediate section 174 is an exterior, annular mounting flange 180 against which abuts the edge-surface 160' of the end-portion 160 of the jaw-member 132. According to this second embodiment, the edge-surface 160' is glued, or otherwise permanently secured, to the annular mounting flange 180 of the male-end sleeve, so that relative movement between the jaw-member 132 and the male-end sleeve 126 is prevented. In addition, it is also preferred that the edge-surface 129 of the end-portion 126' of the male-end sleeve also be glued, or otherwise permanently secured, to the annular flange 162 of the jaw-member.

In operation, after having connected the female end 12' of the hose 12 to the male-end sleeve 126 of the coupler 100 by means of the exterior threads 178, one inserts the male end 14' of the hose 14 into the opening 120" of the main housing 120, while one slides the outer housing 120 to the right, when viewing FIG. 13, against the force of the compression spring 130. By moving the outer housing to the right, the camming surfaces 121 of the main housing is brought out of engagement with the cooperating camming surfaces 156 of the jaws 151, to thereby allow complete entry of the male end 14' into the female end 100" of the coupler 100, so that the male end 14' is located substantially within the interior of the four jaws 151, and in abutting engagement against the washer 124. At this point, the compression spring 128 biases the piston-member 122 to the right to force the washer 124 against the facing edge of the male end 14'. Thereafter, one releases the coupler 100, thereby allowing the outer housing 120 to return to its original position by means of the compression spring 130, at which time the camming surfaces 121 forcibly contract, or compress, the jaws 151 against the juxtapositioned male end 14', so that the threads 152 of the jaws 151 engage with the threads of the male end 14'. Then, the water-pressure is opened, and the ensuing pressurization of the coupler 100 causes the piston-member 122 to be forced to the right, as previously explained. When one wishes to disconnect the male end 14' from the coupler 100, one simply moves the outer housing 120 to the right against the force of the compression spring 130, allowing the jaws 151 to expand, whereupon, one may tilt the male end 14' and then pull it out from the coupler 100. Since the outer housing 120 in this embodiment is not connected to the male-end sleeve 126, the male end 14' may be disconnected from the coupler 100 even when the coupler 10 is still pressurized.

The coupler 100 is also provided with a check valve 190 that is slidingly received in the interior through-opening 174' of the male-end sleeve 126. The check valve 190 has a tubular main section 192 that is capped off at one end by cap or end-wall 192'. The other end of the tubular main section 192 has a circumferential beaded section 194 that prevents the check valve from being disconnected from the coupler 100. As the water flows through the coupler 100 from its female end 100" through its male end 100', the check valve is forced away from seating engagement with the opening 174' by means of water pressure exerted against the cap 192'. This allows normal water flow through the coupler 100. However, whenever the coupler 100 is disconnected from the male end 14', whether under water pressure or not, the back-pressure caused by the water in the hose 12 will force the check valve 190 to seat against the opening 174', to thereby prevent any back-flow of water through the coupler 100 after it has disconnected from the male end 14'. This back-flow is always present in a system whose pressure has been suddenly interrupted or disrupted. This back-pressure will force the check valve to be seated by impinging on the cap or end-wall 192' and moving it to the right , when viewing FIG. 13. Thus, whenever the male end 14' is disconnected from the coupler 100, there is no dripping or flowing of water therefrom, which in conventional-type couplers causes the person to become wet or sometimes soaked, especially if the coupler is removed while the system is still pressurized.

While the description has discussed the connection of hoses, it is to be understood that the coupler of the invention has equal relevance to the coupling of tubes, tubings, and the like, and also to connections not based on threaded interconnection. While the shapes of the tubular elements have been shown as cylindrical, other shapes are, of course, possible. It is, also, possible to use the coupler 10 or 100 for coupling the end sof hoses or tubes, or the like, which do not utilize threaded connections.

While specific embodiments of the invention have been shown and described, it is to be understood that numerous changes and modifications may be made therein without departing from the scope, spirit and intent of the invention as set forth in the appended claims.

What I claim is:

1. A coupler for connection to a hose or tube, comprising:
a hollow, clamping jaw-member having a first female-end portion for connection to a male end of a hose or tube, said clamping jaw-member being contractile for gripping a male end, said jaw-member having a second end-portion spaced from said first female-end portion;
an outer housing mounted telescopingly about, and slidably mounted to, said clamping jaw-member, said outer housing comprising a first end-section operatively associated with said first female-end portion of said clamping jaw-member, and a second end-section spaced from said first end-section, said first end-section comprising means for contracting said female-end portion of said clamping jaw-member to cause said female-end portion to clamp a male end positioned therein;
a seal-loading piston-member at least partially mounted telescopingly and slidingly in said clamping jaw-member, said piston member having a first end associated with said female-end portion of said clamping jaw-member for urging a fluid-sealing member against a juxtapositioned male end positioned in said female-end portion; said piston-member having a second end spaced from said first end;
first fluid-sealing means operatively mounted to said first end of said piston-member for sealing a male end of a hose or tube to said first end of said piston member;
biasing means for urging said first end of said piston-member toward said first female-end portion of said clamping jaw-member;
means for mounting said outer housing for slidable movement relative to said jaw-member; and
second sealing means for sealing said piston-member in said housing;
said means for mounting said outer housing for slidable movement relative to said jaw-member comprises a male-end member intermediate said piston member and said second end portion of said jaw member for connection to a female end of another component; said outer housing being fixedly connected to said male-end member; said male-end member being connected to said outer housing at said second end-section of said outer housing.

2. The coupler according to claim 1, wherein said means for mounting said outer housing for slidable movement relative to said jaw-member comprises an annular flange surrounding a section of said clamping jaw-member, and additional biasing means mounted between said annular flange and said second end-section of said outer housing, said additional biassing means biassing said outer housing toward said first female-end portion of said clamping jaw-member.

3. The coupler according to claim 2, further comprising a valve means mounted in said male-end member, said valve means preventing water from back-pressure to pass through said male-end member after said first female-end portion is disconnected from a male-end of a hose or tube.

4. The coupler according to claim 1, wherein each of said piston-member, said outer housing, and said jaw-member is tubular with a hollow interior for the passage of fluid therethrough.

5. A coupler for connection to a hose or tube, comprising:
a hollow, clamping jaw-member having a first female-end portion for connection to a male end of a hose or tube, said clamping jaw-member being contractile for gripping a male end, said jaw-member having a second end-portion spaced from said first female-end portion; pressurized water entering into said coupler via a male end connected to said first female-end portion of said jaw-member;
an outer housing mounted telescopingly about said clamping jaw-member, said outer housing comprising a first end-section operatively associated with said first female-end portion of said clamping jaw-member, and a second end-section spaced from said first end-section, said first end-section comprising means for contracting said female-end portion of said clamping jaw-member to cause said female-end portion to clamp a male end positioned therein;

means for mounting said outer housing for movement relative to said hollow, clamping jaw-member;

a seal-loading piston-member at least partially mounted telescopingly and slidingly in said clamping jaw-member, said piston member having a first end associated with said female-end portion of said clamping jaw-member for urging a fluid-sealing means against a juxtapositioned male end positioned in said female-end portion; said piston-member having a second end spaced from said first end;

fluid-sealing means operatively mounted to said first end of said piston-member for sealing a male end of a hose or tube to said first end of said piston member;

biassing means for urging said first end of said piston-member toward said first female-end portion of said clamping jaw-member;

a tubular end-member; said tubular end-member being connected to said outer housing said piston-member having at least one outer, annular flange slidable within said end-member; said piston-member and said end-member defining an annular volume between said annular flange and said end-member in which pressurized fluid may be present; and sealing means for fluidly sealing said piston-member within said end-member, said sealing means being located in said annular volume, whereby said piston-member is urged toward said first female-end portion of said jaw-member by the pressurized fluid in said annular volume, so that said fluid-sealing means mounted by said first end of said piston-member is forced against a male end of hose or tube positioned in said first female-end portion of said jaw-member.

6. A coupler for connection to a hose or tube, comprising:

a hollow, clamping jaw-member having a first female-end portion for connection to a male end of a hose or tube, said clamping jaw-member being contractile for gripping a male end, said jaw-member having a second end-portion spaced from said first female-end portion;

an outer housing mounted telescopingly about said clamping jaw-member, said outer housing comprising a first end-section operatively associated with said first female-end portion of said clamping jaw-member, and a second end-section spaced from said first end-section, said first end-section comprising means for contracting said female-end portion of said clamping jaw-member to cause said female-end portion to clamp a male end positioned therein;

means for mounting said outer housing for movement relative to said hollow, clamping jaw-member;

a seal-loading piston-member at least partially mounted telescopingly and slidingly in said clamping jaw-member, said piston member having a first end associated with said female-end portion of said clamping jaw-member for urging a water-sealing member against a juxtapositioned male end positioned in said female-end portion; said piston-member having a second end spaced from said first end;

first water-sealing means operatively mounted to said first end of said piston-member for sealing a male end of a hose or tube to said first end of said piston member;

biassing means for urging said first end of said piston-member toward said first female-end portion of said clamping jaw-member;

second water-sealing means for sealing said piston-member in said housing;

an end-member, said end-member being connected to said outer housing intermediate said piston member and said second of said jaw member;

and water valve means mounted in said end-member, said valve means preventing water to pass through said end-member after said first female-end portion is disconnected from a male end of a hose or tube.

7. The coupler according to claim 6, wherein said means for mounting said outer housing for slidable movement relative to said jaw-member comprises an annular flange surrounding a section of said clamping jaw-member, and additional biassing means mounted between said annular flange and said second end-section of said outer housing, said additional biassing means biassing said outer housing toward said first female-end portion of said clamping jaw-member.

8. The coupler according to claim 6, wherein said tubular end-member comprises a male-end sleeve for coupling to a female end of a component.

9. The coupler according to claim 6, wherein said end-member comprises a portion of one of a: sprinkler, hand-nozzle, and water-tap.

10. A method of preventing backflow of water in a water coupler for connection to a hose or tube, which water coupler comprises a main housing having a first end-section comprising one of a female-end portion and male-end portion for connection to an end of a hose or tube through which pressurized water enters into said coupler, and a second end-section comprising one of a second female-end-portion and male-end portion through which the water exits; and water valve means operatively associated with said second-end-section of said housing, said valve means preventing water from passing through said second end-section of said housing after said first female-end portion is disconnected from a male end of a hose or tube, the method comprising:

(a) connecting said first end-section to an end of a first tubular component;

(b) connecting said second end-section to an end of a second tubular component;

(c) delivering water through said first component, then through said water coupler, and then through said second component;

(d) disconnecting said first component from said first end-section of said coupler; and (e) said step (d) moving said valve means into its closed position, whereby water from said second component is prevented from flowing backwards through said coupler.

* * * * *